United States Patent [19]

Mounier-Poulat et al.

[11] Patent Number: 4,717,170

[45] Date of Patent: Jan. 5, 1988

[54] AXLE-CHASSIS CONNECTING DEVICE

[75] Inventors: François Mounier-Poulat; Marcel Savoie, both of Heyrieux; Patrick Berthon, Saint-Priest, all of France

[73] Assignee: Renault Vehicules Industriels, Lyons, France

[21] Appl. No.: 920,191

[22] Filed: Oct. 17, 1986

[30] Foreign Application Priority Data

Oct. 29, 1985 [FR] France .................. 85 16029

[51] Int. Cl.$^4$ .............................................. B60G 5/00
[52] U.S. Cl. ..................................... 280/683; 280/676; 280/702; 180/24.01
[58] Field of Search ...................... 280/683, 704, 81.5, 280/676, 702; 180/24.08, 56, 41, 24.01

[56] References Cited

U.S. PATENT DOCUMENTS

| 2,918,292 | 12/1959 | Carmichael, Jr. et al. | 280/6 R |
| 3,295,623 | 4/1963 | Kyzer | 180/24.08 |
| 3,340,946 | 9/1967 | Whitehead | 280/683 |
| 4,057,121 | 3/1976 | Stedman | 180/56 |
| 4,530,515 | 7/1985 | Raidel | 280/683 |

FOREIGN PATENT DOCUMENTS 2573362 11/1984 France .

Primary Examiner—Richard A. Bertsch
Attorney, Agent, or Firm—Oblon, Fisher, Spivak, McClelland & Maier

[57] ABSTRACT

Axle-chassis connecting device is particularly for a commercial vehicle having two tandem axles of the hydropneumatic suspension type. The vertical load coming from the chassis is transmitted directly to the wheels by jacks (23) without passing through the axle tanks, and is taken into account near the wheel plane by means of a multifunction part (20) which further assures, simultaneously, the connection of the axle to the chassis by a longitudinal guide rod (26) and the transmission of the braking torques coming from the braking means (35).

5 Claims, 4 Drawing Figures

AXLE-CHASSIS CONNECTING DEVICE

BACKGROUND OF THE INVENTION

This invention relates to a simplified, tandem-axle connecting device, particularly for a commercial vehicle having two tandem axles and more particularly to the rear axle of vehicles for large tonnage road transport.

In general, the two axles of a tandem consist of hollow beams that contain the mechanical elements for transmission of the drive force, called axle tanks. The arms of these tanks connecting their central part to the wheels and through which the axle shafts pass, generally have different zones specially made to:

1. transmit the vertical load,
2. transmit the longitudinal forces passing through the rods for connection with the chassis of the vehicle,
3. transmit the braking forces that pass through the fastening of the brake support.

There are many known systems for connection between the axle tanks and the chassis frame, this latter being generally made up of two parallel and horizontal longitudinal beams; thus, according to known systems, the vertical loads are transmitted through leaf or compressed-air springs, the longitudinal and transverse forces being compensated for by specific fittings, or by the fastening of the leaf springs, or further by the trailing arms.

In any case, the number of parts necessary for taking into account the forces in the above devices is greater than that which results from putting this invention into practice.

Another drawback resulting from axle-chassis connecting systems according to the prior art resides particularly in absorbing the vertical forces at the level of the axle tank.

Actually, the load coming from the fifth wheel of the trailer, and which is directed to the wheels, normally passes through the axle tanks. These latter are handicapped because of the very considerable local reinforcements and the costly machinings that this arrangement imposes on them.

Another negative factor suffered by the axle tanks results from the bending that the absorption of the vertical forces imposes on them and which is proportional to the distance D (or offset) separating the wheel plane from the point of application of said vertical forces. This causes a dimensioning of the tank axle, hence an increase in its bulk, its weight and its price, proportional to the size of offset D.

SUMMARY OF THE INVENTION

This invention has as its object to eliminate the preceding drawbacks, particularly by directly transmitting the load from the fifth wheel to the wheels, thereby avoiding the introduction of vertical, or longitudinal, loads at the level of the axle tanks and by reducing offset D between the load on the ground under the wheel and the support of the suspension agent.

BRIEF DESCRIPTION OF THE DRAWINGS

Other advantages of the invention will come out from the description, given by way of nonlimiting example with regard to attached FIGS. 1 to 4 in which.

DETAILED DESCRIPTION OF THE PREFERRED EMBODIMENTS

Figure 1:
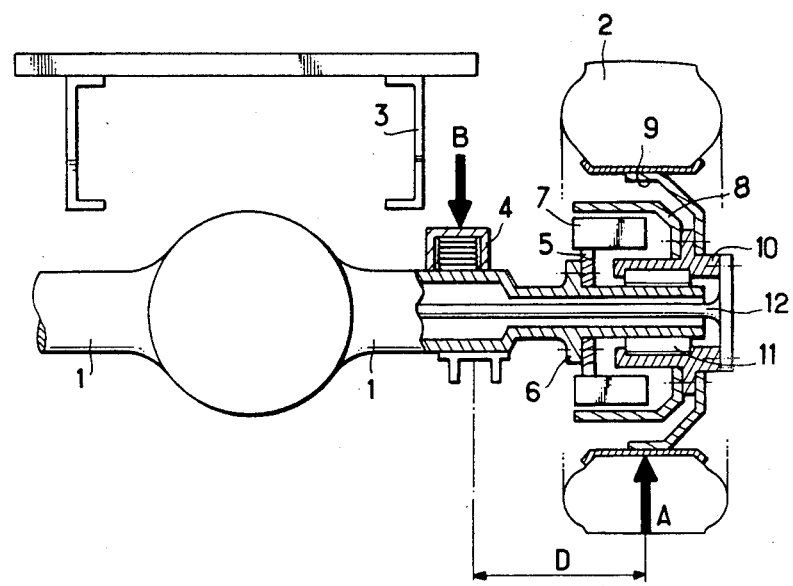
FIG. 1 is a section of a plane crosswise to the vehicle of an axle-chassis connection according to the prior art.

Referring to an axle-chassis connection device according to the prior art, such as for example shown in FIG. 1, it is seen that it is made up of a pair of axle tanks 1 connected, on the one hand, to wheels 2, and on the other hand, to chassis frame 3 by any known vertical force support means (here a leaf spring 4), introducing on corresponding axle tank 1, the vertical forces coming from chassis 3. This zone should therefore be reinforced accordingly, particularly to avoid any bending, proportional to distance D (offset) between the load on the ground under the wheel at A and the support of the suspension agent at B, shown in the figure by a leaf spring 4.

Moreover, the wheel side end of the axle tank is the point of application of various loads, involving considerable local reinforcements and costly machinings cost increases and this, the more these specially configured zones are separate from one another.

It is this way, for example, for the transverse and longitudinal forces, and braking torques, each being exerted on different parts. Concerning the braking forces, it is seen in FIG. 1 that a standard device intended to absorb them consists of a support 5 fastened to a small collar 6 of axle tank 1, holding nonrotating part 7 of the brake.

Mobile part 8 of this latter, for example a drum, and wheel 9 are made solid with a hub 10, rotating on a bearing 11 and driven by an axle shaft 12.

Figure 2:
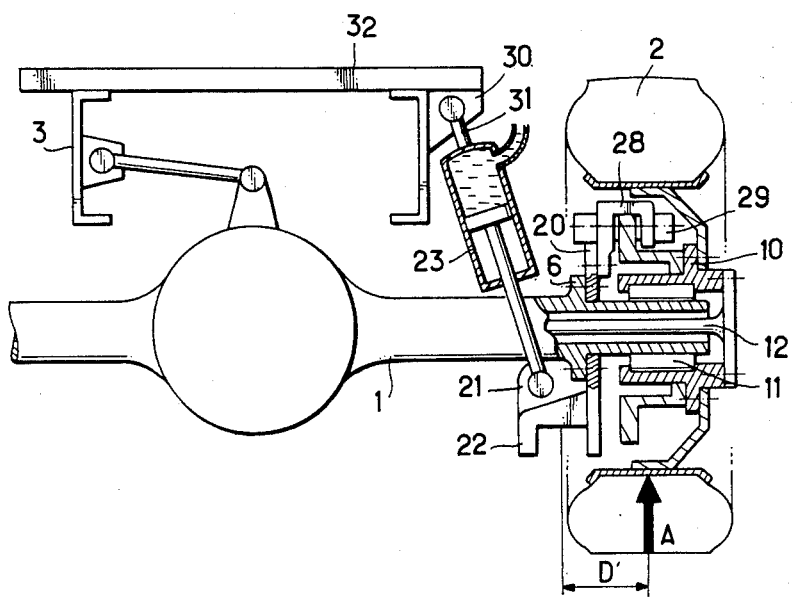
FIG. 2 is a view of a connection similar to that of FIG. 2 but according to the invention.

FIG. 2, by a view similar to the preceding one, shows an axle-chassis connecting device according to the invention. It differs fundamentally from the device of FIG. 1 by the following points:

1. The presence at the wheel side end of the axle tanks, of a multifunction single part 20 transmitting at the same time the vertical forces, the connection forces with a guide rod and the braking forces.
2. Direct transmission to the wheels of the load coming from the chassis, without passing through the axle tanks.
3. The connecting of the jacks at the side of the vehicle by a gas spring, thus constituting a hydraulic rocker arm.

Figure 3:
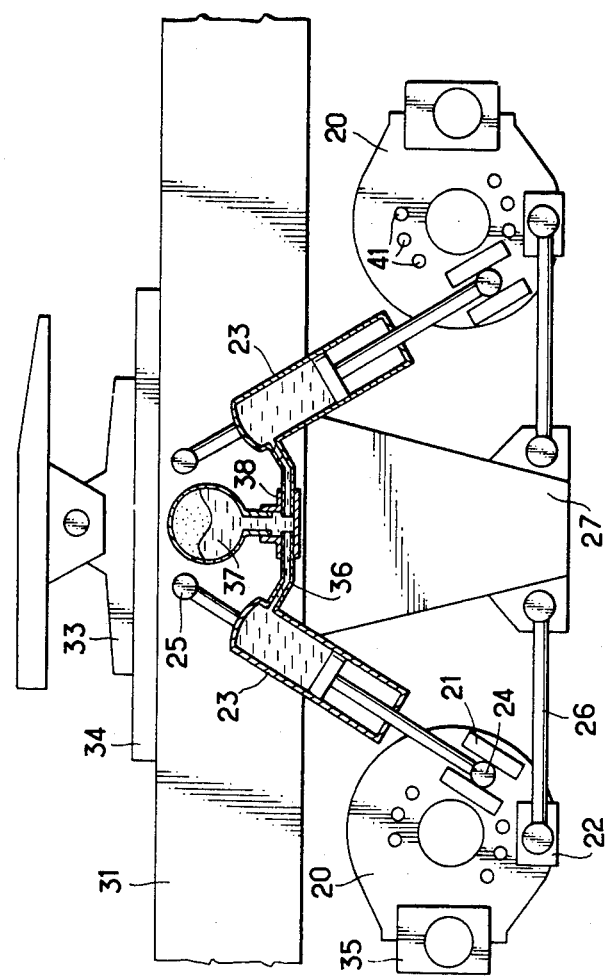
FIG. 3 is to a section along a longitudinal plane of the vehicle, mounting the connection according to the invention, seen from the side.
Figure 4:
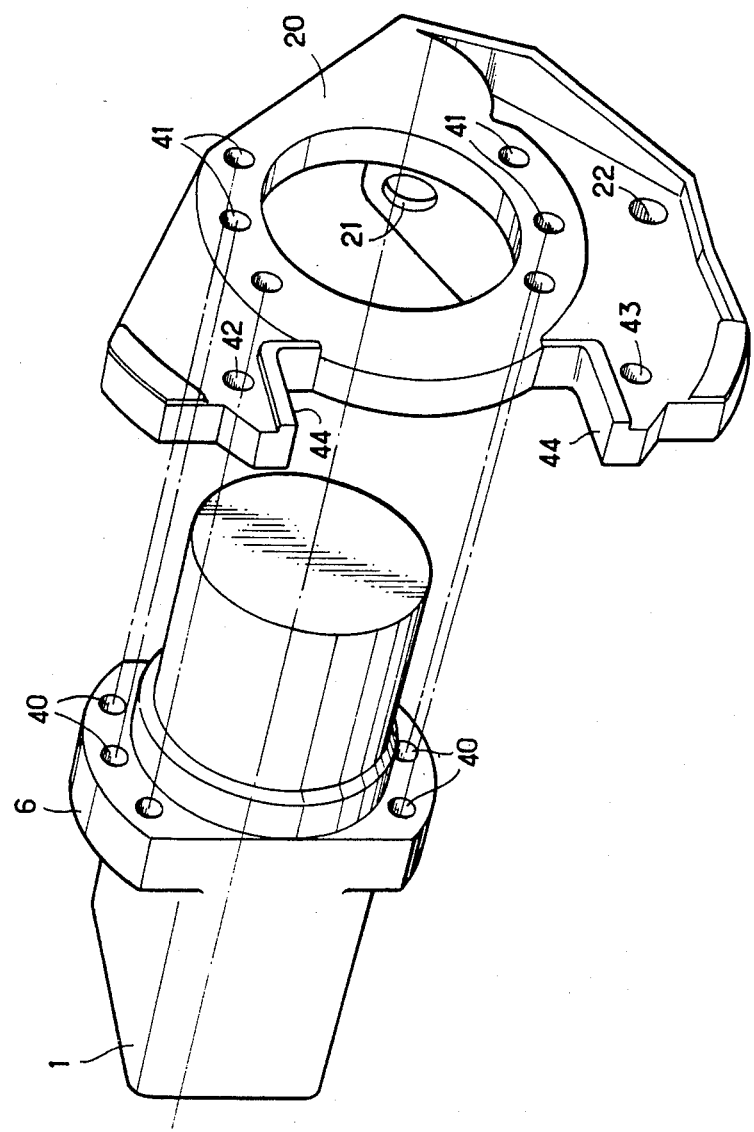
FIG. 4 is to an enlarged detail, seen in perspective, of a basic element in the connection according to the invention.

Multifunction part 20 above can be seen from the front in FIG. 2, from the side in FIG. 3 and, enlarged and in perspective in FIG. 4.

Referring to FIG. 2, it is seen that this part 20 is fastened to small collar 6 on the end of axle tank 1.

FIG. 3 shows that the internal face of part 20 has on its lower part two yokes 21–22 used for support, the first 21 for the fastening of a suspension jack 23, mounted on a ball joint at each of its ends 24–25 and transmitting to wheel 2 the load coming from chassis 3, the second 22 for longitudinal support means in the form of a longitudinal connecting rod 26 whose opposite end is solid with a support 27 fastened to chassis 3.

It will be noted that the upper part of multifunction part 20 is used as a brake support means, either for the stationary part of a drum system (not shown), or in case of a disk system, for the stationary or floating caliper 28 intended to squeeze disk 29, solid with hub 10 of wheel 2.

In the case of a stationary caliper, this latter can be incorporated into the mass of multifunction part 20.

The upper connection of jack 23 rests on a fitting 30 solid with chassis 3.

In the case of a semitrailer, this fitting 30 will advantageously be buttressed between side rails 31 and fifth wheel 32.

Multifunction part 20 can be seen better in detail and in perspective in FIG. 4, in which its adaption to axle 10 and against small collar 6 ending axle tank 1 is seen. The lower part of this part 20 is provided with supports 21 and 22 receiving respectively the lower connection of jack 23 and for fastening of rod 26.

Openings 41 of the upper and lower zones of this part 20 cooperate with their opposite numbers 40 of small collar 6, making possible their fastening by bolting. Openings 42-43 are intended for the guiding of the floating caliper, if such is the case, the reaction surfaces of brake lining supports 35 being designated by 44.

In the case of a two-axle tandem, FIG. 3 shows the fastening of the lower part of suspension jacks 23 making possible an optimal mounting of these latter in the case of a semitrailer equipped with a fifth wheel 33.

Side rails 31 of the main structure support in an ordinary way a fifth wheel support 34 and fifth wheel 33. Multifunction parts 20, on which the brake part at 35 and the fastening of longitudinal rod 26 have been shown, are made so as to make possible an orientation of each suspension jack 23 which corresponds to a convergence of the assembly of jacks toward the load introduced by the semitrailer.

This arrangement has the advantage of appreciably decreasing the stresses on carrying structure 3 by the vertical loads introduced by the support of the semitrailer on fifth wheel 33.

As previously mentioned, it will be noted that said loads are transmitted directly to wheels 2 by jacks 23, without passing through axle tanks 1 and that offset D' is much less than its opposite number D of the device in FIG. 1, thereby avoiding the problems of reinforcement of tanks 1.

It will further be noted, in FIG. 3, that suspension jacks 23 are advantageously connected to one another by a piping 36, on the one hand, and, on the other hand, one or more gas accumulators 37 performing the function of suspension spring. The connection by piping 36 makes it possible to make a suspended hydraulic rocker arm controlling the distribution of the loads between the axles. This connection comprises a device 38 for controlling the flow and pressure, acting as shock absorber. As a variant, gas springs could be incorporated into each of the jacks.

The arrangement according to the invention is particularly well-suited to the case of a semitrailer vehicle having two driving axles. However, this arrangement is advantageous in the case where a single axle of the tandem is driving, the hydraulic jacks being able to have different characteristics. Multifunction fitting 20 which makes it possible to simplify the embodiment of the above-described axle tanks is also applicable in the case of an isolated axle, driving or not.

We claim:

1. An axle-chassis connecting device in a vehicle having a chassis, tandem axles with axle tanks, and wheels including brakes connected to ends of said axles, said device comprising:

a multifunction part fixed to each of said axle tanks adjacent one of said wheels;

vertical force support means directly connected between said chassis and each said multifunction part for transferring vertical forces from said chassis to said wheels;

longitudinal support means connected between said chassis and each said multifunction part for transferring longitudinal loads from said chassis to said wheels; and braking support means mounted on each said multifunction part for supporting a stationary portion of a wheel brake, whereby loads on said axle tanks are minimized.

2. The connecting device of claim 1, wherein said chassis includes a fifth wheel and wherein said vertical force support means comprises a hydraulic jack aligned between each said multifunction part and said fifth wheel.

3. The connecting device according to claim 2 including a gas accumulator mounted on said chassis and means for fludically communicating two jacks of said opposite ones of said tandem axles with one another and for fludically communicating said two jacks with said accumulator, whereby said jacks, said longitudinal support means and said multifunction parts form a hydraulic rocker arm.

4. The connecting device of claim 1 wherein said longitudinal support means comprises a longitudinal support rod pivotally connected to said chassis and said multifunction part.

5. The connecting device according to claim 1 wherein said multifunction part incorporates said stationary portion of a wheel brake.

* * * * *